(12) United States Patent
Mendez et al.

(10) Patent No.: US 6,785,443 B2
(45) Date of Patent: Aug. 31, 2004

(54) OPTICAL FIBER BRAGG GRATING TUNING DEVICE

(75) Inventors: Alexis Mendez, Fremont, CA (US); Mario Pacheco, Fremont, CA (US); Steve Montesanto, Palo Alto, CA (US); Gershon Perelman, Cupertino, CA (US); William Wang, Pleasanton, CA (US); Jason Zweiback, Fremont, CA (US)

(73) Assignee: Teraxion Inc., Sainte-Foy (CA)

( * ) Notice: Subject to any disclaimer, the term of this patent is extended or adjusted under 35 U.S.C. 154(b) by 92 days.

(21) Appl. No.: 10/062,577

(22) Filed: Jan. 30, 2002

(65) Prior Publication Data

US 2003/0012499 A1 Jan. 16, 2003

(Under 37 CFR 1.47)

Related U.S. Application Data

(60) Provisional application No. 60/266,683, filed on Feb. 5, 2001.

(51) Int. Cl.⁷ .................................................. G02B 6/34
(52) U.S. Cl. ............................ 385/37; 385/12; 385/13; 385/31; 385/136; 385/137
(58) Field of Search ............................. 385/12, 13, 39, 385/136, 137, 37, 31, 139

(56) References Cited

U.S. PATENT DOCUMENTS

| 5,007,705 | A | | 4/1991 | Morey et al. ............. 385/37 X |
| 5,787,213 | A | * | 7/1998 | Brownlow ................... 385/37 |
| 5,999,671 | A | | 12/1999 | Jin et al. .................. 385/37 X |
| 6,055,348 | A | | 4/2000 | Jin et al. .................. 385/37 X |
| 6,301,423 | B1 | * | 10/2001 | Olson ......................... 385/135 |
| 6,361,299 | B1 | * | 3/2002 | Quigley et al. ............ 428/36.3 |
| 6,374,014 | B1 | * | 4/2002 | Jablonski ..................... 385/37 |
| 6,424,784 | B1 | * | 7/2002 | Olson ......................... 385/135 |
| 6,471,710 | B1 | * | 10/2002 | Bucholtz .................... 606/130 |

FOREIGN PATENT DOCUMENTS

WO    WO 00/07047    2/2000    ............ 385/37 X

OTHER PUBLICATIONS

International Search Report—PCT/US02/05007 dated Jul. 9, 2003.

* cited by examiner

Primary Examiner—Brian M. Healy
(74) Attorney, Agent, or Firm—Fulbright & Jaworski LLP

(57) ABSTRACT

The present invention is directed to a system and method for tuning an optical fiber Bragg grating by using a circular mechanism which uniformly stretches the fiber along its length while at the same time preserving the minimal size for stretching.

27 Claims, 4 Drawing Sheets

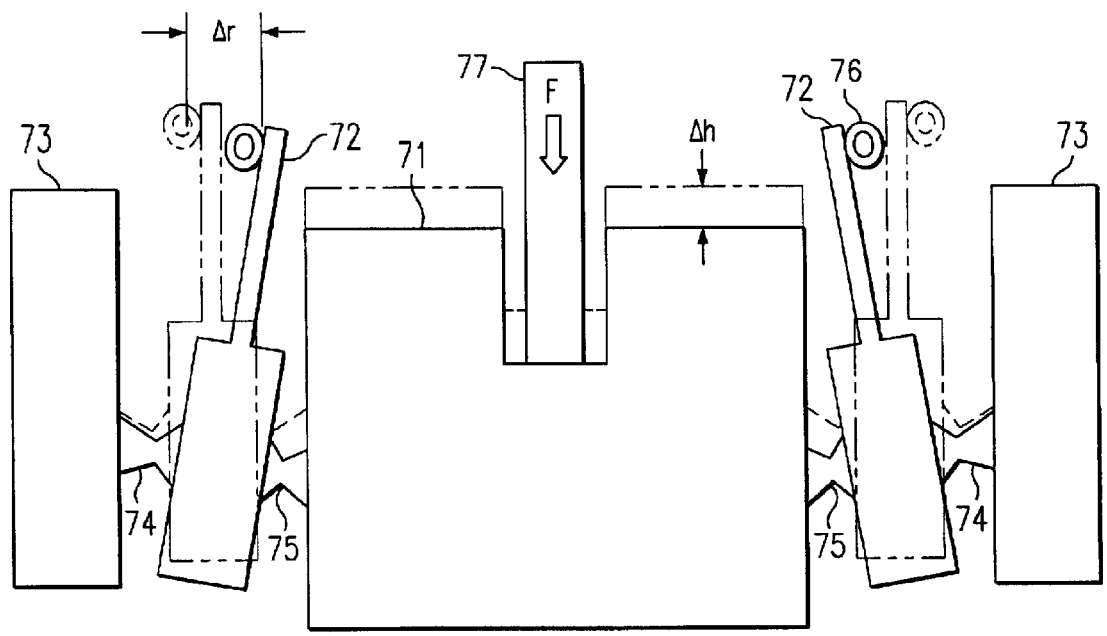
FIG. 7
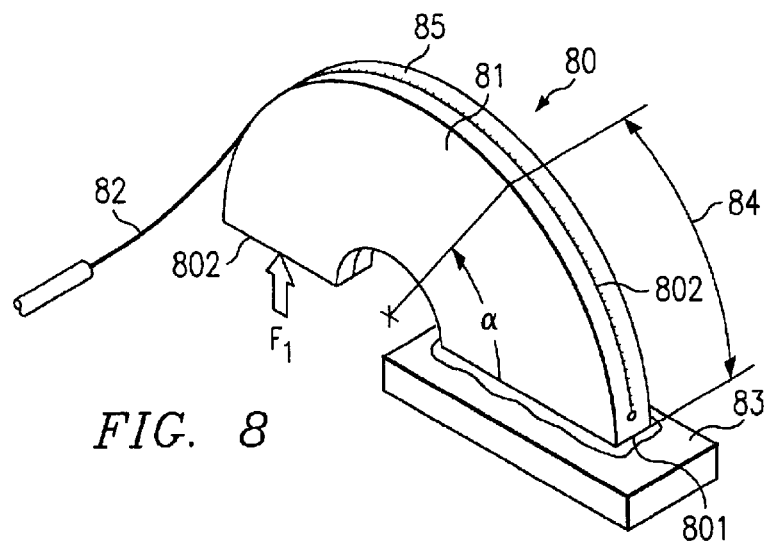
FIG. 8
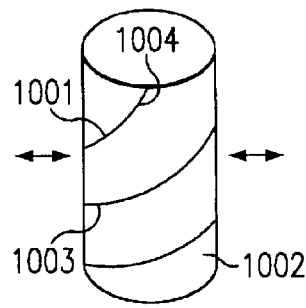
FIG. 10
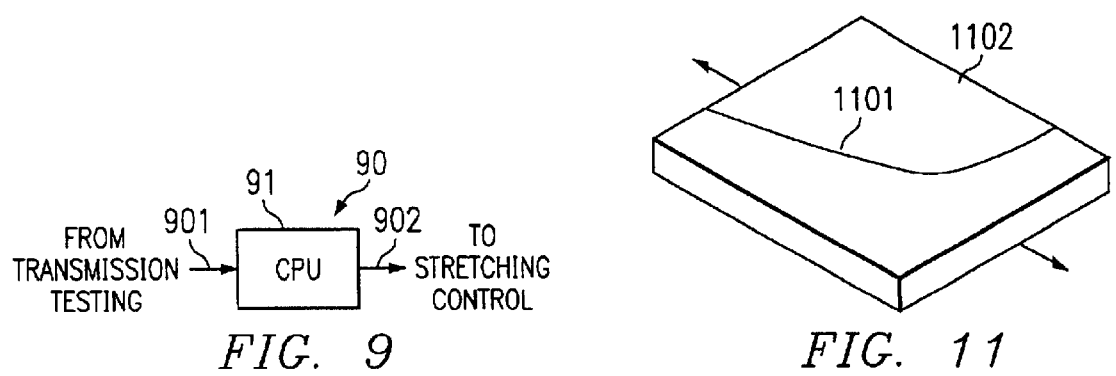
FIG. 9
FIG. 11

OPTICAL FIBER BRAGG GRATING TUNING DEVICE

RELATED APPLICATIONS

The present application claims priority of benefit to Provisional Application No. 60,266,683, filed Feb. 5, 2001, entitled "OPTICAL FIBER BRAGG GRATING TUNING DEVICE," the disclosure of which is hereby incorporated herein by reference.

TECHNICAL FIELD

The invention relates generally to fiber optic communication technologies, and more specifically to a system and method for tuning optical fiber Bragg grating by a mechanically induced strain along the fiber.

BACKGROUND

It is well known that the wavelength center of fiber Bragg gratings can be shifted by either temperature or strain variations, or both. These tuning properties have been widely used in telecommunications.

Chromatic dispersion in a single mode optical fiber is an important problem to solve when such optical fibers are used for telecommunication. This phenomenon induces an undesirable broadening in data pulses, which appears because there is a time delay between different wavelength components. In order to eliminate this kind of dispersion, the negative dispersion exhibited by linearly and non-linearly optical fiber Bragg gratings has been widely used.

Because chromatic dispersion depends on the characteristics of the fiber in a telecommunications system, a grating with an adjustable chirp is more convenient for its compensation.

Tunable devices stretching a chirped fiber grating to compensate for the chromatic dispersion produced by single mode fibers in optical pulses are prior art. All of them, however, apply strain along the fiber grating in a linear fashion.

For those applications where long fiber gratings are needed, the use of long stretcher mechanisms increases the dimensions of dispersion compensations systems. On the other hand, mechanical vibrations alter the spectral characteristics of a fiber grating, either if is suspended or bonded, when using long linear stretcher mechanisms. This affects the performance of the tunable dispersion compensation devices.

For example, in U.S. Pat. No. 5,999,671, a device is shown that is longitudinally stretched to change the central wave length of the Bragg grating, and accomplishing the same function is shown in U.S. Pat. No. 6,055,348 which uses magnetostrictive devices, the disclosures of which are hereby incorporated herein be reference. As discussed above, these patents, while perhaps accomplishing the desired end result, do so at the cost of size and complexity. Another disadvantage is the lack of uniformity along the longitudinal axis of the servo strained element.

A different type of arrangement for changing the Bragg filter center frequency is shown in U.S. Pat. No. 5,007,705 where a cylindrical piezoelectric device is shown wrapped with the fiber around its outer circumference, the disclosure of which is hereby incorporated herein by reference. Upon the application of an energy source, the piezoelectric element changes its diameter thereby changing its circumference so as to adding more or less strain onto the transmission cable. This changes the Bragg filter center wavelength. This patent is also hereby incorporated by reference herein.

SUMMARY OF THE INVENTION

The present invention is directed to a system and method for tuning an optical fiber Bragg grating by using a circular mechanism which uniformly stretches the fiber along its length while at the same time preserving the minimal size for stretching. This method may also provide a smaller package footprint for chromatic dispersion compensation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 7 shows a cross-section of an alternative embodiment of the present invention, which includes a flexible tubular element titled under the relative movement between two concentric elements;

FIG. 8 shows an alternative embodiment of the present invention, consisting of a half circle beam affixed to a plate;

FIG. 9 shows control where signals from transmission tests come into the CPU where they are processed, and perhaps stored for future use;

FIG. 10 shows an alternative embodiment of the present invention, consisting of a circular ring; and FIG. 11 shows an exemplary use of a flat substrate with the present invention.

DETAILED DESCRIPTION

Figure 1:
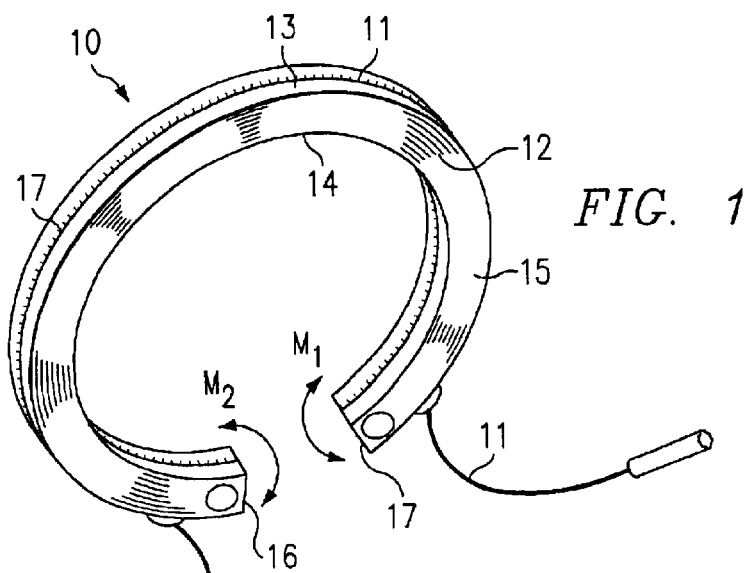
FIG. 1 shown the present invention system, which includes a uniform cross section circular beam around a positioned fiber Bragg grating.

In FIG. 1, there is shown system 10 which includes uniform cross section circular beam 12 around which is positioned fiber Bragg grating 11 which ideally would be bonded to outer surface of beam 13. Also, note that fiber Bragg grating 11 could be bonded to inner surface 14 or surface 15, if so desired. Fiber grating 11 could be bonded around the periphery or there could be groove 17 of beam 13 that would be cut into the outer surface to make a smooth finish where the fiber Bragg grating would be embedded. The longitudinal axis of fiber Bragg grating 11 is at a different position than the neutral axis of beam 13. Fiber Bragg grating 11 may be closer or father to the approximate center of the bending moment. It should be noted that the neutral axis of beam 13 corresponds to the axis of zero strain during any bending moment.

Applying moments $M_1$ and $M_2$ to ends 16 and 17 produce a linear strain along the circumference of beam 12. Thus, fiber grating expands or compresses depending the direction of rotation.

Figure 2:
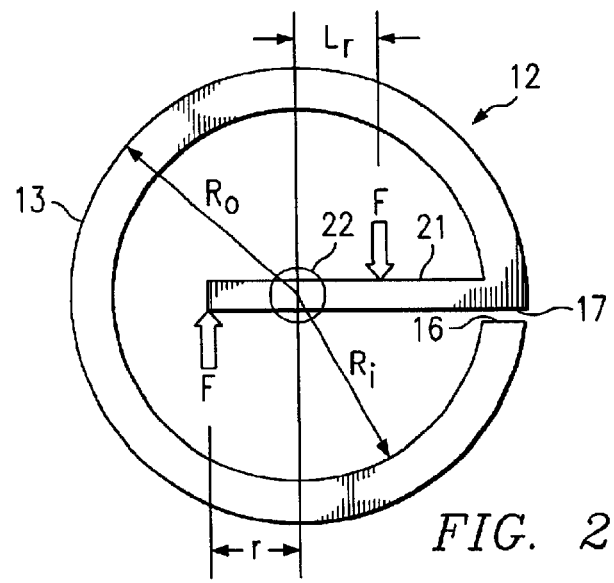
FIG. 2 shows a schematic of one system and method of applying the bending moment to a circular beam.

FIG. 2 shows a schematic of one system and method of applying the bending moment to beam 12. In this FIGURE, end 16 of beam 12 is fixed and end 17 is connected to spoke 21, which in turn has its inner end fastened around pivot 22 at the center of beam 12. Accordingly, a turning moment applied along beam 21 as shown by force F, effectively changes the circumference of beam 12, thereby changing the length of fiber grating 11 (FIG. 1) around the circumference. Applying the force in one direction would produce strain along the circumference, while applying the force in the opposite direction would produce this strain in the opposite direction, thereby either compressing or stretching, respectively, fiber grating 11.

Element 12 could be one element of a longitudinal spring, which when twisted in one direction causes its circumference to contract and when twisted in the other direction causes the circumference to expand. This compression or expansion would be even along the length of the spring.

Figure 3:
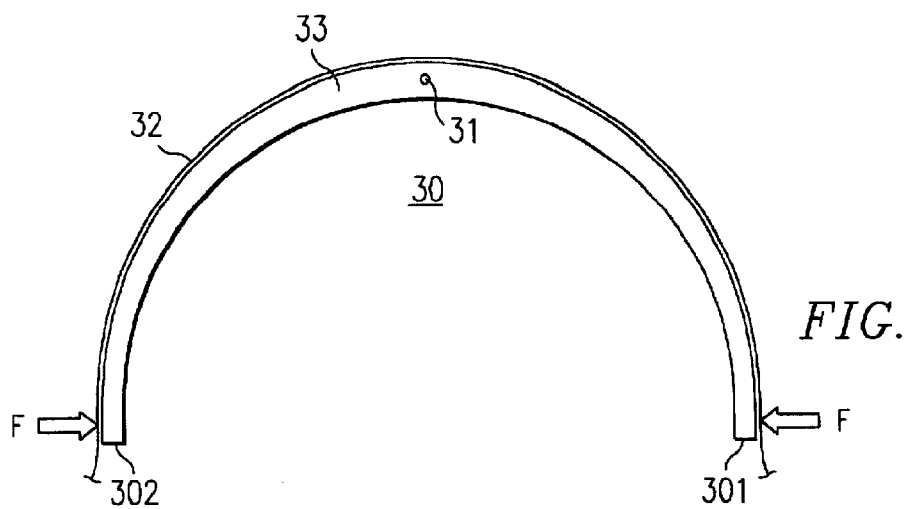
FIG. 3 shows an alternate embodiment of the present invention, which includes a fiber Bragg grating bonded along its outside circumference.

FIG. 3 shows alternate embodiment 30 which includes beam 33 having fiber 32 bonded along its outside circumference. Squeezing forces F are applied to outside ends 301, 302 of beam 33 in such a way that a uniform strain is produced along the outside circumference of the beam itself. The profile of the beam itself is also designed (ideally hyperbolic) with the cross section of the beam at ends 301, 302 being narrower than at apex 31 of the arc.

Figure 4:
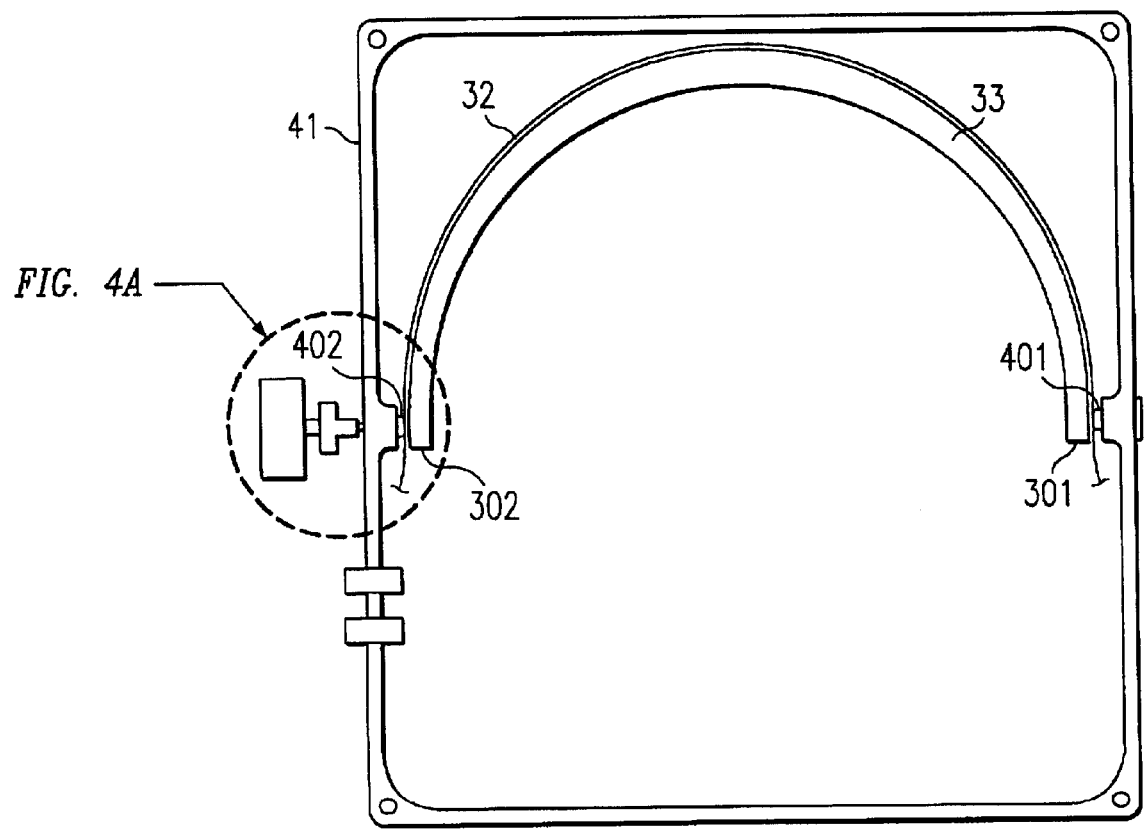
FIG. 4 shows another embodiment for the expansion or contraction of circular beam of FIG. 3.

FIG. 4 shows another embodiment for the expansion or contraction of beam 33. In this embodiment, beam 33 is fixedly attached at end 301 to pin 401 on one side of housing 41. The other end 302 of beam 33 is forced against fine threaded screw 402 such that when torque is applied to the screw, either inward or outward, beam 33 moves in or out bending the beam, and thus changing the strain distribution along the beam length. Fiber Bragg grating 32 bonded to the outer surface of beam 33 is then tuned under the applied strain.

Screw 402 can be either torqued manually or electronically and can be both locally or remotely controlled. It could also be that a second screw 402 could replace pin 401 for gross tuning when you have to move a longer distance and then moving down to one screw when the resolution becomes tight. In such a situation, the screw threads could, if desired, have different pitches.

Figure 4A:
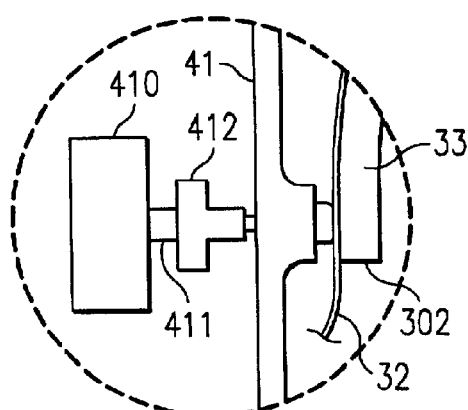
FIG. 4A shows a remote controlled actuator turning or pushing a screw or control rod to apply force through the housing to the end of the support circumference.

FIG. 4A shows remote controlled actuator 410 turning or pushing (via shaft 411) screw or control rod 412 so as to apply force through housing 41 to end 302 of support circumference 33. Actuators used may be of a variety of types, including, ferroelectric actuators, ferromagnetic actuators, motorized actuators, mechanical actuators, and thermal actuators.

Figure 5:
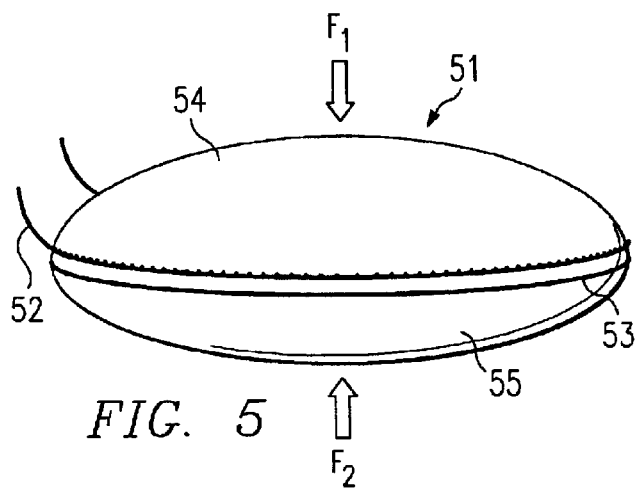
FIG. 5 shows an alternate embodiment of the present invention, which includes a spheroidal shell.

FIG. 5 shows a circular mechanism to apply strain along a fiber grating, which considers the use of a flexible ellipsoidal shell 51. Fiber grating 52 is fixed around the equatorial circumference 53. Applying forces $F_1$ and $F_2$ (which are equals in magnitude) to the top 54 and bottom 55 shells alter the perimeter of equatorial plane 53, thus applying an axial strain to fiber grating 52.

Figure 5A:
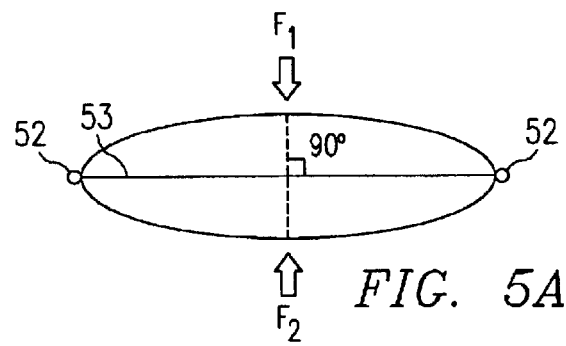
FIG. 5A shows a cross section of the spheroid shell depicted in FIG. 5.

In order to obtain uniform axial strain along fiber grating 52, the direction of forces $F_1$ and $F_2$ have to be perpendicular with respect to equatorial plane 53, as shown in FIG. 5A. The forces have to be applied symmetrically with respect to the equatorial plane. Otherwise, the strain applied to the fiber grating is non-uniform. Note that force can be applied by any number of means such as hydraulic screw torque clamping action, air pressure, etc.

Figure 6:
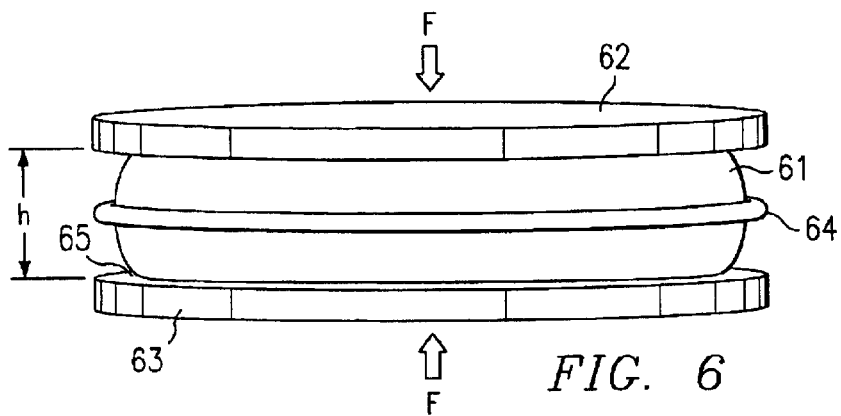
FIG. 6 shows an alternative circular system for the fiber grating straining application, which is formed by a flexible ring covered by two discs.

FIG. 6 shows another circular mechanism to apply strain along a fiber grating. It is formed by flexible ring 61 covered by two discs 62, 63. Discs 62, 63 are separated by distance h. Bonding the contact regions 65 between discs avoids relative movement.

Figure 6A:
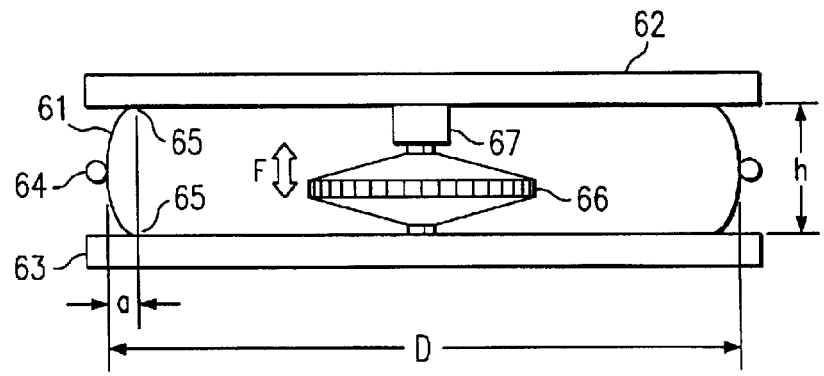
FIG. 6A shows the cross sections of the alternative circular system for the fiber grating straining application shown in FIG. 6.

Ring 61 has a curved cross section, as shown in FIG. 6A. When force F is applied to discs 62, 63, distance h changes; this alters diameter D and thus the circumference of ring 61. Fiber grating 64 fixed along this circumference is then uniformly strained under applied force F.

Force F can be externally applied using different methods. However, an internally applied force reduces the dimensions of the circular mechanism. For instance, piezoelectric transducer 66, as shown in FIG. 6A, can apply the required force, from the inside, to move discs 62, 63 forward and backward.

In order to compensate for any thermally induced wavelength shift in fiber grating 64, bar 67 can be incorporated. Choosing the appropriate material, bar 67 increases (or decreases) h causing ring 61 to contract (or expand) by a, thus changing the applied strain to fiber grating 64. The thermal compensation system also takes into account the expansion coefficient of discs and ring materials.

In an alternate embodiment, strain may be induced on fiber grating 64 by selecting an appropriate material which expands and contracts relative to the temperature. Materials with greater than average coefficients of thermal expansion may be among the materials chosen. An example of such a material is Ni—Ti.

FIG. 7 shows a cross-section of another circular stretcher mechanism. It is formed by three elements 71, 72, 73, connected by flexible web shells 74, 75. Elements 72 and 73 are tubular, and element 71 is a solid cylinder.

As element 71 moves up and down under applied force F, and as element 73 remains in a fixed position, tubular element 72 tilts, by Δr, due to the pivoting action of web shells 74 and 75. This produces a shear strain in tubular element 72.

Fiber grating 76, bounded around the circumference of tubular element 72, can be axially strained under applied force F. If force F moves the cylindrical element 71 up, by Δh, the strain along fiber grating 76 is positive (expansion); conversely, the strain along fiber grating 76 is negative (compression) when force F moves cylindrical element 71 down, by Δh.

To obtain uniform strain along fiber grating 76, force F is symmetrically applied on the circular face of cylinder 71. Otherwise, non-uniform strain profiles are applied along fiber grating 76. Note that force F can be applied by using different methods.

To compensate any thermally induced wavelength shift in fiber grating 76, this circular mechanism incorporates bar 77. By doing this, any force applied to the bar is transmitted to cylindrical element 71. By choosing an appropriate thermal expansion coefficient, bar 77 expands or compresses under temperature variations, thus producing negative or positive strain along fiber grating 76, as required for its thermal compensation.

Turning now to FIG. 8, there is shown system 80 which is another alternative embodiment consisting of half circle beam 81 affixed to plate 83 by, for instance, bond 801. Fiber grating 82 is bonded to the circumference of beam 81. As force $F_1$ is applied upward or downward on beam end 802, circumference 85 changes in accordance with force $F_1$.

For an area of ∝, shown as 84, along circumference 85, the linear change is uniform with respect to force $F_1$. Therefore, fiber grating 802 is advantageously placed within this zone to achieve uniform control of the strain of the fiber Bragg grating.

For situations where it is desired to obtain non-linear changes in the fiber grating, then fiber grating 802 can be positioned at different locations around the circumference in varying degrees. Alternately, the geometry of beam 81 may be changed by variations in the width or thickness to achieve non-linear strain on fiber grating 82.

FIG. 9 shows control 90 where signals from transmission tests, such as signal to noise ratio (SNR), quality measurement, spectrum analysis, etc. come into CPU 91 via 901, where they are processed, and perhaps stored for future use. CPU 91 then generates proper force applying signals and transmits these signals, via 902, to one or more devices, such as device 33, shown in FIG. 4A, for selectively adjusting the spacings of the selected fiber Bragg grating.

FIG. 10 shows an exemplary use of the present invention wherein fiber grating 1001 is wrapped around circular elongated ring 1002 such that the pitch varies. A varying pitch results in various portions of fiber grating 1001 that are at different angles to the stretching direction. Circular elongated ring 1002 stretches in the direction shown by the arrows, thus, a section of fiber grating 1001, such as section 1003, parallel to the circumference of circular ring 1002 receive maximum strain, whereas a section of fiber grating 1004 at an angle perpendicular to the circumference would receive no strain.

FIG. 11 portrays FIG. 10's circular ring 1002 unfurled into flat substrate 1102, wherein fiber grating 1001 is held at various angles with respect to the stretching direction of flat substrate 1102. The equation:

$$\varepsilon_\varsigma \approx \frac{\left(1-\left(\frac{dy}{dx}\right)^2 v\right)}{\left(1+\left(\frac{dy}{dx}\right)^2\right)} \varepsilon_x$$

where ε is strain relating strain in a flat substrate to strain in an attached fiber grating, may be used to calculate a desired amount of strain in fiber grating 1001 relative to the strain placed upon flat substrate 1102.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for uniformly changing the length of an optic fiber along its longitudinal axis, said device comprising:
    a support having a circumference around a single point;
    a fiber having its longitudinal axis attached to said support circumference so that the longitudinal axis of said fiber assumes the same geometry as said support circumference; and
    a mechanism for changing said support circumference.

2. The device of claim 1 wherein said fiber is not coaxial to the neutral axis of said support.

3. The device of claim 1 further comprising:
    a mechanism for unfurling said support; and
    a mechanism for at least one of stretching and compressing said support.

4. The device of claim 1 wherein:
    said support is composed of a material capable of expanding and contracting when heat is applied and removed respectively; and
    said expanding and contracting mechanism is temperature dependant.

5. The device of claim 4 wherein said material possess a greater than average coefficient of thermal expansion.

6. The device of claim 4 wherein said material is Ni—Ti.

7. The device of claim 1 wherein said support circumference does not complete a 360 degree circle, thereby having at least two ends at which force can be applied.

8. The device of claim 1 wherein said mechanism applies selective force to at least one of said ends of said support circumference.

9. The device of claim 8 wherein said force is applied as a torque.

10. The device of claim 7 wherein one of said ends is affixed to a rigid structure and wherein said mechanism applies a force to said other end.

11. The device of claim 7 wherein said circular support has a cross section thicker at its apogee than at its respective ends.

12. The device of claim 11 wherein said mechanism includes applying force to one of said ends while the other of said ends is held rigid.

13. The device of claim 11 wherein said mechanism includes applying force to both of said ends.

14. The device of claim 12 wherein said support structure is within a housing and wherein said force is applied by a screw pressing against at least one of said ends, said screw being supported by said housing.

15. The device of claim 7 wherein said optic fiber is part of a fiber optic transmission cable and wherein said mechanism is remotely activated.

16. The device of claim 15 wherein said remote activation results from performance observations of transmission along said fiber optic cable.

17. The device of claim 1 wherein said circular support has a cross section adapted to produce any desired non-uniform strain along said fiber.

18. The device of claim 1 wherein said fiber is a fiber Bragg grating.

19. A device for changing the applied strain in a fiber Bragg grating, said device comprising:

a circular support having a radius of curvature defined by radius R, said circular support not forming a continuous loop, thereby having ends;

means for attaching a portion of said cable containing said fiber Bragg grating to the periphery of said circular support; and means for causing said ends to expand with respect to each other thereby changing radius R.

20. The device of claim 19 wherein said attachment is to the outer surface of said support.

21. The device of claim 20 wherein said outer surface has a groove therein for positioning said cable.

22. The device of claim 19 wherein said attachment is to the inner surface of said support.

23. The device of claim 19 wherein said attachment is to a side surface of said support.

24. The device of claim 19 wherein said device is contained within a housing having an input and an output for said cable; and wherein said flex causing means includes means for applying forces to at least one of said ends, said forces applied with respect to said housing.

25. The device of claim 19 wherein said flex causing means is responsive to remotely provided signals.

26. The device of claim 19 wherein said flex causing means is controlled by adjustments applied manually.

27. The device of claim 19 wherein said flex causing means is controlled remotely in response to transmission tuning signals.

* * * * *